United States Patent
Wise et al.

(10) Patent No.: US 10,996,932 B1
(45) Date of Patent: May 4, 2021

(54) PIPELINE FOR SOFTWARE APPLICATION DEVELOPMENT

(71) Applicant: InvestCloud Inc, West Hollywood, CA (US)

(72) Inventors: John W. Wise, West Hollywood, CA (US); Yaela Shamberg, Santa Monica, CA (US)

(73) Assignee: InvestCloud Inc, West Hollywood, CA (US)

( * ) Notice: Subject to any disclaimer, the term of this patent is extended or adjusted under 35 U.S.C. 154(b) by 0 days.

(21) Appl. No.: 16/660,099

(22) Filed: Oct. 22, 2019

(51) Int. Cl.
    *G06F 8/35*     (2018.01)
    *G06F 8/34*     (2018.01)
    *G06F 8/10*     (2018.01)

(52) U.S. Cl.
    CPC ............... *G06F 8/35* (2013.01); *G06F 8/10* (2013.01); *G06F 8/34* (2013.01)

(58) Field of Classification Search
    CPC .......................................................... G06F 8/35
    USPC .......................................................... 717/104
    See application file for complete search history.

(56) References Cited

U.S. PATENT DOCUMENTS

| | | | | |
|---|---|---|---|---|
| 9,158,559 | B2 * | 10/2015 | Simmons | G06F 9/44505 |
| 9,753,608 | B2 * | 9/2017 | Smoak | G06F 3/04842 |
| 2010/0050152 | A1 * | 2/2010 | Gilboa | G06F 40/14 |
| | | | | 717/106 |
| 2018/0081994 | A1 * | 3/2018 | Ron | G06F 8/34 |

* cited by examiner

*Primary Examiner* — Evral E Bodden
(74) *Attorney, Agent, or Firm* — Patent Ingenuity, P.C.; Samuel K. Simpson (57) ABSTRACT

A process receives, via a processor, a software application model. Further, the process determines, with the processor, one or more core operations to be performed by a software application to be built. The one or more core operations are based on the software application model. Additionally, the process generates, with the processor, one or more functionality criteria based on the one or more core operations. Moreover, the process generates, with the processor, one or more device-specific graphical user interfaces corresponding to each of a plurality of devices that implement the software application to be built according to the one or more functionality criteria. Finally, the process generates, with the processor, the software application based on the one or more core operations, the one or more functionality criteria, and the one or more device-specific graphical user interfaces.

18 Claims, 5 Drawing Sheets

PIPELINE FOR SOFTWARE APPLICATION DEVELOPMENT

BACKGROUND

1. Field

This disclosure generally relates to the field of computing systems. More particularly, the disclosure relates to software development.

2. General Background

With recent technological advances, software applications are being utilized by users with increased prevalence in a variety of contexts. For example, users may access software applications, from a variety of computing devices (e.g., desktop computer, laptop computer, smartphone, tablet device, smart watch, smart wearable, virtual reality ("VR") headset, augmented reality ("AR") glasses, etc.), to perform various tasks. For instance, such software applications may help users manage their financial goals (e.g., via a financial technology ("Fintech") platform), track their finances, communicate with other users, etc.

To meet the increased demand for such software applications, software developers often take an ad hoc approach to formulating an approach for a particular software development project. In other words, a software developer may try to figure out how to develop a software application after he or she starts the development process, without much planning at the outset.

As a result, many software applications are developed in a manner that is not conducive to achieving maximum usage by users. For example, a software developer will typically prepare a software application (e.g., a web portal) for usage on one device (e.g., a desktop computer) without much, if any, consideration as to how users may interact differently with that software application on a different type of device (e.g., a tablet device). For instance, a software developer may use the exact same web portal content on the desktop computer as on the tablet device. Yet, users may interact differently with content on a desktop computer than on a tablet device. Further, certain computational and functional errors may result from a device with a different operating system, and other associated software and/or hardware, trying to perform the exact same functionality.

Once the software application has been developed, subsequent attempts to extend the application's functionality to different devices may be difficult, and error prone. In other words, many current software approaches lack comprehensive planning for optimizing user interactivity and/or device functionality.

SUMMARY

In one aspect of the disclosure, a computer program product is provided. The computer program product comprises a non-transitory computer useable storage device having a computer readable program. The computer readable program when executed on a computer causes the computer to receive, via a processor, a software application model. Further, the computer is caused to determine, with the processor, one or more core operations to be performed by a software application to be built. The one or more core operations are based on the software application model. Additionally, the computer is caused to generate, with the processor, one or more functionality criteria based on the one or more core operations. Moreover, the computer is caused to generate, with the processor, one or more device-specific graphical user interfaces ("GUIs") corresponding to each of a plurality of devices that implement the software application to be built according to the one or more functionality criteria. Finally, the computer is caused to generate, with the processor, the software application based on the one or more core operations, the one or more functionality criteria, and the one or more device-specific GUIs.

In another aspect of the disclosure, a system has a data storage device that stores the software application model. In addition, the system has a processor that performs the functionality of the computer program product.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A pipeline for software application development is provided. The pipeline provides a start-to-finish framework for developing a software application. Rather than taking the ad hoc approach of previous configurations, which is error-prone and leads to device performance inefficiencies, the pipeline is a robust system for developing a software application that is extendable to a myriad of devices, each having different functionality and user requirements.

As an example, the pipeline for software application development may be utilized to develop applications (e.g., web portals) that communicate with financial technology ("Fintech") platforms. For instance, such applications may allow users to store financial documents, view financial goals, etc. The Fintech example is discussed, and illustrated, only for purposes of providing an example of a type of software application that may be developed with the pipeline; accordingly, the pipeline may be utilized to develop other types of software applications.

Figure 1:
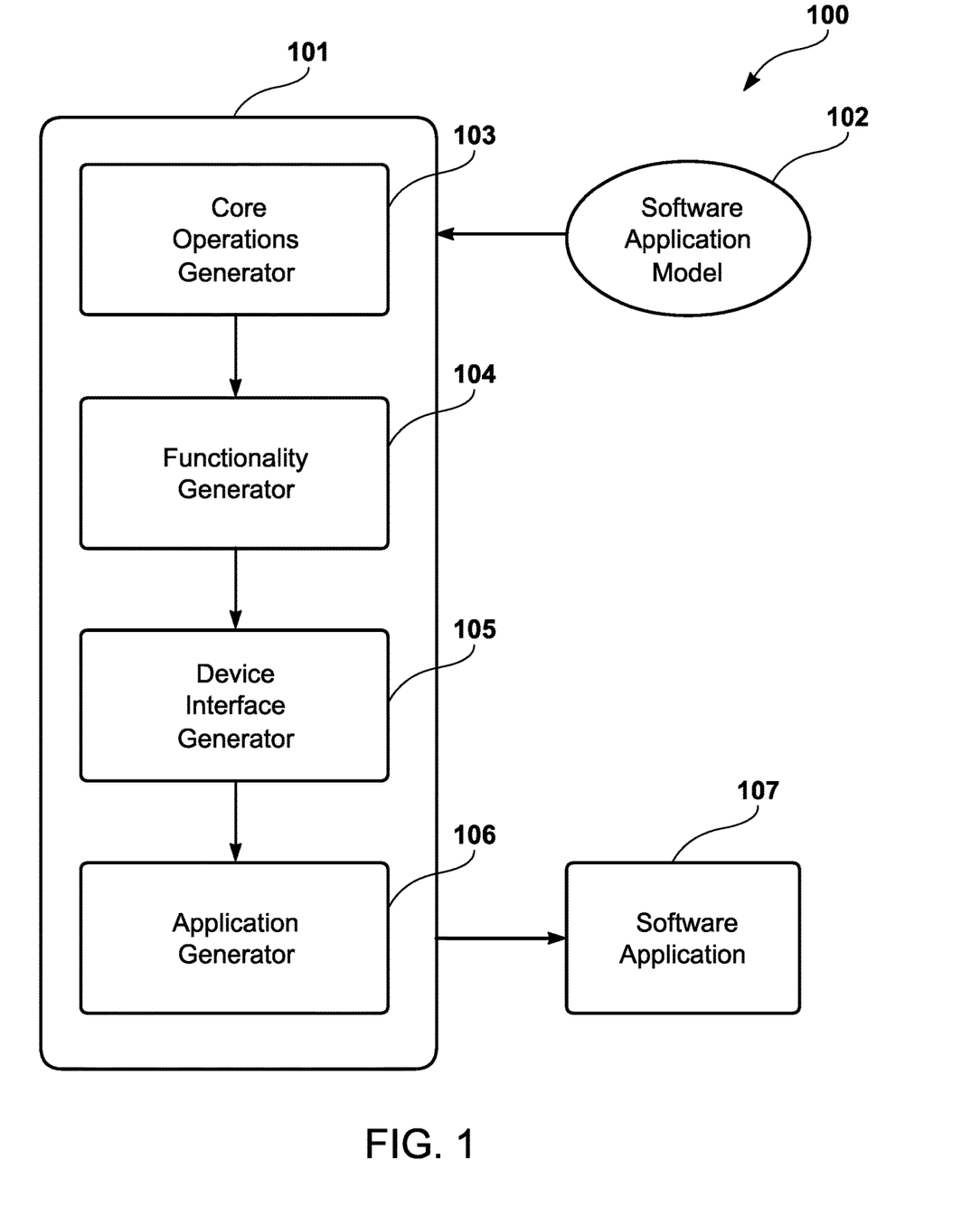
FIG. 1 illustrates a pipeline system that may be used to develop a software application.

FIG. 1 illustrates a pipeline system 100 that may be used to develop a software application. For instance, the pipeline system 100 may have a pipeline engine 101 that may be used to receive a software application model 102 and output a software application 107. In one embodiment, the pipeline system 100 is an interactive system that communicates with one or more users and/or software developers at various stages of software development to develop and deploy a software application 107. In another embodiment, the pipeline system 100 is an automated system that receives the software application model 102 as an input, and outputs the software application 107 as an output. Various forms of inputs (e.g., written, oral, video, etc.) may be used to provide the software application model 102 to the pipeline system 100.

For example, the software model 102 may be an application requirements document, which may outline the requirements of the software application without much, if any, categorization. In other words, the software model 102 may include various criteria for the software application to be built, but without necessarily providing prioritization or categorization of any of the requirements. In essence, the software model 102 may be an unfiltered data model without a framework for software development and deployment.

Further, a user may have particular goals to be accomplished via the software application 107, and may outline those goals in the software application model 102. The pipeline system 100 may extract those goals from the software application model 102 and generate a pipeline with different stages of development based on those goals. For purposes of illustration, an example of a Fintech software application is discussed. For instance, one or more users may want to develop a lifestyle application that aims to make managing financial, and/or other life, tasks easy and fun in a simple way; such goals may be outlined in the software application model 102.

Figure 2:
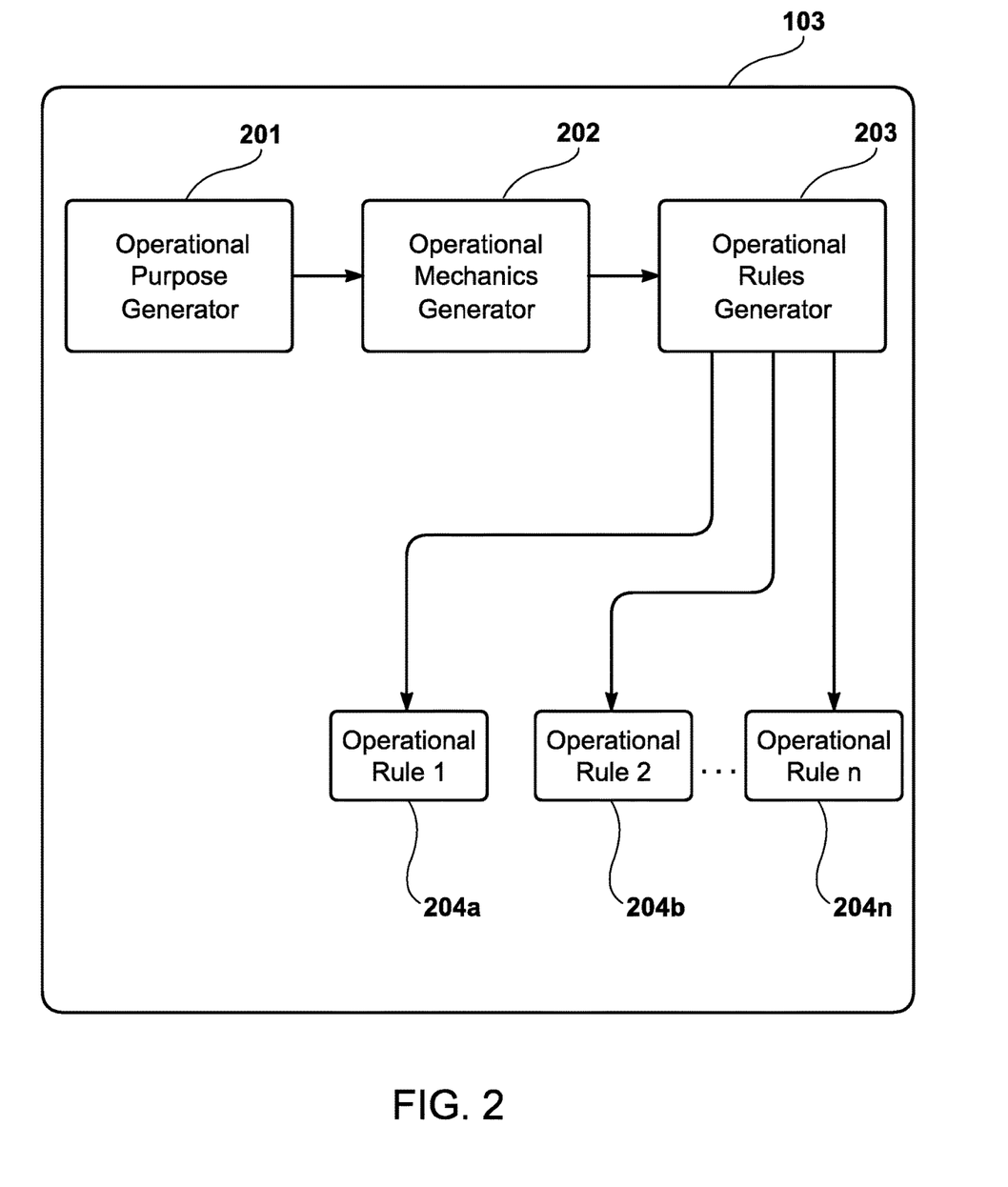
FIG. 2 illustrates the internal components of the core operations generator.

After the software application model 102 is inputted to the pipeline engine 101, a core operations generator 103 determines the core operations that have to be performed in order to meet the intended goals stated, or deduced, from the software application model 102. Turning to FIG. 2, which illustrates the internal components of the core operations generator 103, the core operations are determined from the inputted software application model 102. An operational purpose generator 201 may determine, from the software application model 102, the operational purpose (i.e., the 'why') of the software application 107 to be built. In one embodiment, the operational purpose generator 201 extracts data (e.g., text, images, etc.) pertinent to the operational purpose from the software application model 102, analyzes the data, and determines the operational purpose from the extracted data. For example, the software application model 102 may delineate the operational purpose with certain words or phrases (e.g., 'why,' 'need,' etc.). The core operations generator 103 may then search through the software application model 102 for text in proximity to such predetermined operational purpose identifiers, aggregate the data, and analyze the data to determine which data is most representative of the software application model 102.

As another example, the operational purpose generator 201 renders an interactive session (e.g., via images, video, text, audio, etc.) to determine the operational purpose. For example, the operational purpose generator 201 may generate a series of questions, and follow-up questions, based on the software application model 102 and/or inputs provided by one or more system users (i.e., users involved in the creative and design processes) and software developers.

As yet another example, the operational purpose generator 201 deduces the operational purpose of the software application 107 to be built without the operational purpose being stated in the software application model 102. For instance, the operational purpose generator 201 may be in operable communication with, or have integrated therein, a neural network and/or artificial intelligence ("AI") system that uses machine learning to deduce the operational purpose of the software application 107 to be built, based on training of what purpose was intended for previous software applications. In other words, the software application model 102 may be an unfiltered set of data that is prepared by a user and/or software developer independently of any particular framework, and the operational purpose generator 201 deduces the operational purpose of the software application 107 to be built without an explicit statement by the system user and/or software developer. In essence, the operational purpose generator 201 may figure out the operational purpose of the software application 107 for the system user and/or software developer.

As another example, the operational purpose generator 201 may rely on a direct input of the operational purpose, either stated in the software application model 102 or provided directly by the system user and/or software developer.

With respect to the Fintech example, any of the configurations provided for herein may be used to determine what the operational purpose of a particular Fintech application to be built is from the software application model 102. For instance, the operational purpose generator 201 may determine that the operational purpose of the Fintech application is for an application user to take stock of his or her life and store personal documents in a simple, fun, and easy way.

Based on the operational purpose that is determined by the operational purpose generator 201, the pipeline engine 101 proceeds to determining the actual mechanics of how to achieve that operational purpose via the operational mechanics generator 202. In one embodiment, the mechanics for implementing the operational purpose is unknown at the time that the software application model 102 is generated, and the operational mechanics generator 202 deduces the operational mechanics (i.e., 'how') based on the determined operational purpose. For example, in the instance where the operational purpose is unknown at the time the software application model 102 is generated, a high probability exists that the operational mechanics are also unknown. The operational mechanics generator 202 may then search a database for contexts with similar operational purposes to deduce what operational mechanics would be helpful in implementing the operational purpose. For example, the operational mechanics generator 202 may determine (e.g., via machine learning) what computing devices were used for other Fintech software applications, and then determine which of those computing devices are capable of achieving the operational purpose.

In another embodiment, the operational mechanics generator 202 bases its determination, at least in part, on an interactive session with a system user and/or software developer. For example, the operational mechanics generator 202 may provide one or more questions (e.g., via a display device, audio input, etc.) to the system user and/or software developer to help determine an optimal implementation. For instance, the operational mechanics generator 202 may pose a series of questions directed toward devices that are expected to be used with the particular Fintech application (e.g., desktop computer, tablet device, and smartphone).

With respect to the Fintech example, the operational mechanics generator 202 may have determined the operational mechanics to be universal device accessibility for an application user's personal and financial documents. Other possible operational mechanics may be used for different Fintech examples, or examples in other contexts.

Upon determining the operational purpose and the operational mechanics, the core operations generator 203 uses an operational rules generator 203 to determine one or more rules 204*a*-204*n* that may be used to implement the software application 107 in accordance with the operational purpose and the operational mechanics.

For instance, in one embodiment, the operational rules generator 203 may perform a subsequent search (or an initial search if a previous search was not performed) through the software application model 102 to find terminology/phraseology that is consistent with the operational purpose and operational mechanics. The operational rules generator 203 may then generate operational rules 204a-204n that are consistent with the operational purpose and the operational mechanics. For example, the operational rules 204a-204n may be the following: (1) store, organize, and share data in a centralized location; (2) track assets in a way that allows a user to measure where he or she is versus where he or she should be; (3) provide goal-based planning in a manner that allows for planning for financial-, career-, social-, physical-, and community-based goals; (4) provide alerts to help manage personal finances; and (5) generate life scores and recommendations based on other community members.

In another embodiment, the operational rules generator 203 may utilize machine learning (e.g., via AI, a neural network, etc.) to determine how other operational rules were determined in other contexts. For example, the operational rules generator 203 may receive one or more inputs corresponding to previous operational purposes and operational mechanics, in addition to the resulting, previous operational rules. Accordingly, the operational rules generator 203 may be trained to generate (e.g., via asking certain questions during an interactive session, deducing certain information, etc.) the operational rules 204a-204n in a similar manner to that of previously generated operational rules.

In yet another embodiment, the operational rules generator 203 is a recommendation engine that recommends certain operational rules to a system user and/or software developer, who then selects the resulting operational rules 204a-204n. In another embodiment, the operational rules generator 203 receives a direct input from the system user and/or software developer indicating the one or more operational rules 204a-204n.

Turning again to FIG. 1, the pipeline system 101 has a functionality generator 104 that implements functionality according to the operational rules 204a-204n illustrated in FIG. 2. For example, the functionality generator 104 may utilize the operational rules 204a-204n to establish an interactive session with the system user and/or software developer to determine functionality to be implemented by the software application 107.

Figure 3:
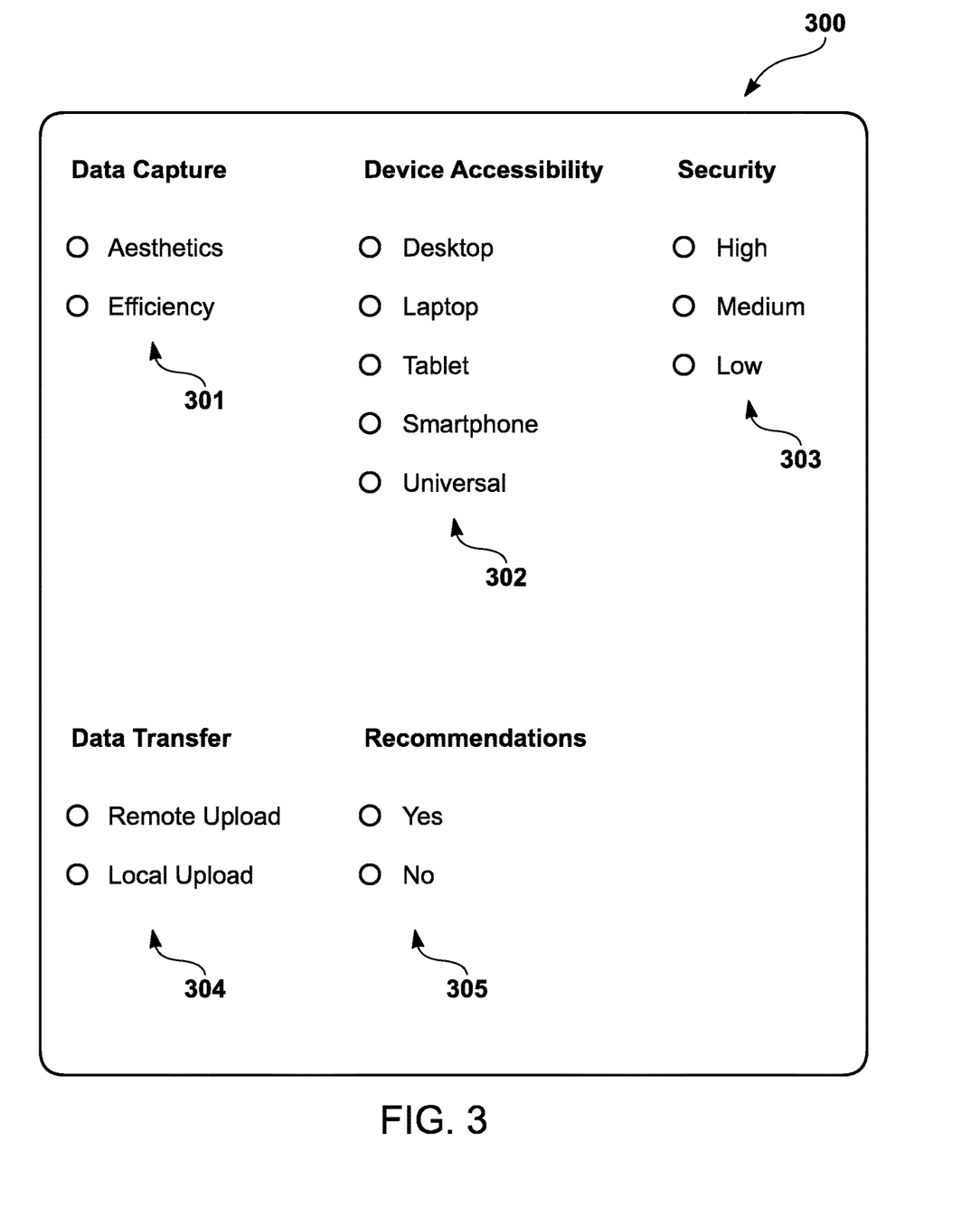
FIG. 3 illustrates an interactive form generated by the functionality generator.

For example, FIG. 3 illustrates an interactive form 300 generated by the functionality generator 104 (FIG. 1). The interactive form 300 has various fields/buttons 301-305 corresponding to data pertinent to determining functionality for the software application 107; such data is derived, at least in part, by the functionality generator 104 based on the operational rules 204a-204n (FIG. 2).

For instance, the interactive form 300 may have a data capture field with one or more input buttons 301. The data capture field may be used to determine the style of the workflows presented to the user of software application 107. As examples, the buttons may correspond to aesthetics, efficiency, etc. For instance, by a system user and/or software developer indicating both aesthetics and efficiency, the functionality generator 104 may conclude that workflows with a high degree of aesthetics and usability should be implemented in the software application 107.

As another example, a device accessibility field may have various buttons 302, or drop-down menus, for determining what type of devices should have access to the software application 107. For example, one software developer may need the software application 107 to be universally accessible from a myriad of computing devices, whereas another software developer may only want the software application 107 to be accessible from a particular device.

Various other types of fields, with corresponding buttons 303-305, may also be displayed to obtain data regarding other types of functionality (e.g., capabilities such as security, data transfer, recommendations, etc.).

Although the interactive form 300 is illustrated, other input mechanisms (e.g., microphone, image capture device, etc.) may be used to obtain input from the system user and/or software developer regarding the software application 107. In an alternative embodiment, the functionality generator 104 determines functionality without use of the interactive form 300. For example, the functionality generator 104 may determine functionality based on analyzing other software applications deployed by the entity requesting development of the software application 107.

Turning again to FIG. 1, the pipeline system 100 uses a device interface generator 105 to generate a GUI corresponding to each type of device on which the software application 107 may be implemented. For instance, if the system user and/or software developer determine that the software application 107 should have universal accessibility, the device interface generator determines GUIs specific to each type of device. For example, the device interface generator 105 may generate a design layout for a desktop that emphasizes a full screen experience; conversely, the device interface generator 105 may generate a GUI that displays certain, or possibly different features, instead of others that would be viewed on the desktop GUI. For instance, given the smaller processing power and screen dimensions of a smartphone when compared with a desktop computer, the smartphone GUI is optimized to display smaller screens and features that are more conducive to mobile device interaction than a desktop computer. As another example, a tablet device GUI may be optimized to have some features of the desktop computer GUI and other features of the smartphone GUI.

In one embodiment, the device interface generator 105 interacts with the system user and/or software developer to generate the device-specific GUIs. For example, the device interface generator 105 may generate recommended GUI designs (based on screen dimensions, previously determined features that performed in an optimal manner as determined from one or more GUI design databases, etc.) and present the recommended GUI designs to the system user and/or software developer (e.g., via a display screen) for approval and/or modification.

In another embodiment, the device interface generator 105 receives one or more GUI design inputs. For instance, the device interface generator 105 may receive one or more images that may be modified (e.g., changed to fit device specific screen dimensions, meet operational rules 204a-204n, etc.) by the device interface generator 105.

In another embodiment, the device interface generator 105 automatically generates the device specific GUIs without input from the system user and/or the software application developer. For instance, the device interface generator 105 may deduce, via machine learning based on what GUIs were optimal for previous configurations, the optimal features and/or display dimensions for GUI interfaces for particular devices.

Figure 4:
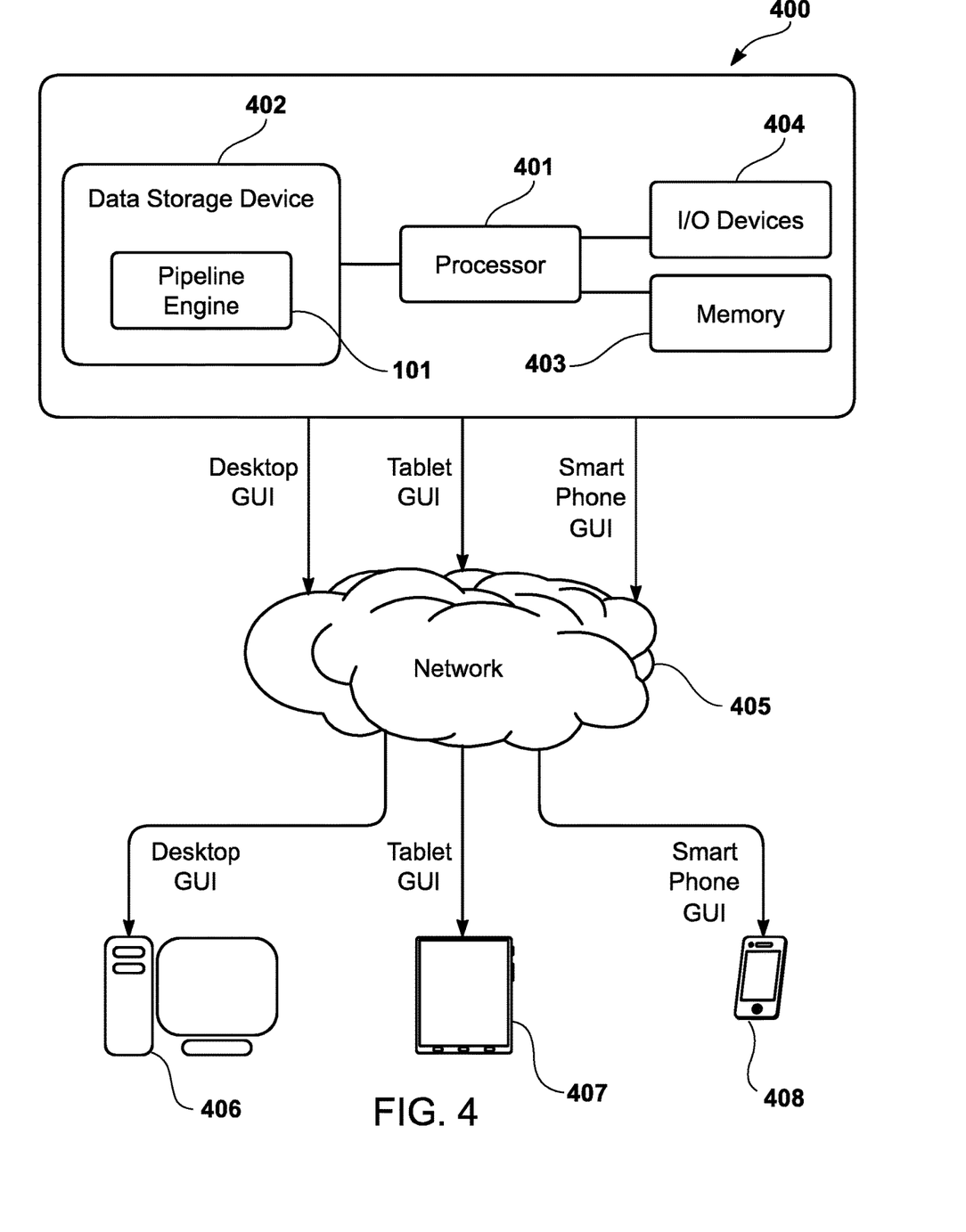
FIG. 4 illustrates a computing system that utilizes the pipeline engine to generate device-specific GUIs.

As an example of a system implementation that implements the pipeline engine 101 illustrated in FIG. 1, FIG. 4 illustrates a computing system 400 that utilizes the pipeline engine 101 to generate device-specific GUIs. For instance, the computing system 400 has a processor 401 that is in operable communication with the pipeline engine 101, as stored on a data storage device 402. Further, the processor 401 is in operable communication with a memory device 403 and various input/output ("I/O") devices 404.

The processor 401 utilizes the device interface generator 105 of the pipeline engine 101 to generate device-specific GUIs such as, for example, a desktop GUI for a desktop computer 406, a tablet GUI for a tablet device 407, and a smartphone GUI for a smartphone 408. Further, the processor 401 transmits the device-specific GUIs through a computerized network 405 to various devices 406, 407, and 408. In one embodiment, the processor 401 transmits the device-specific GUIs as part of the software application 107. In another embodiment, the processor 401 transmits the device-specific GUIs independently of the actual software application 107 (e.g., prior to transmitting the software application 107).

Turning again to FIG. 1, the pipeline engine 101 uses an application generator 106 to generate the software application 107 based on the operational rules 204a-204n (FIG. 2), the generated functionality, and/or the device-specific GUIs.

In one embodiment, the software application 107 is generated based on certain assumptions that may be independent of the operational rules 204a-204n (FIG. 2), the generated functionality, and/or the device-specific GUIs. For example, data dependencies (e.g., data privacy and/or security), account information, data updates, user assets, calculations, etc. may be built-in, or later added via updates, to the software application 107.

Figure 5:
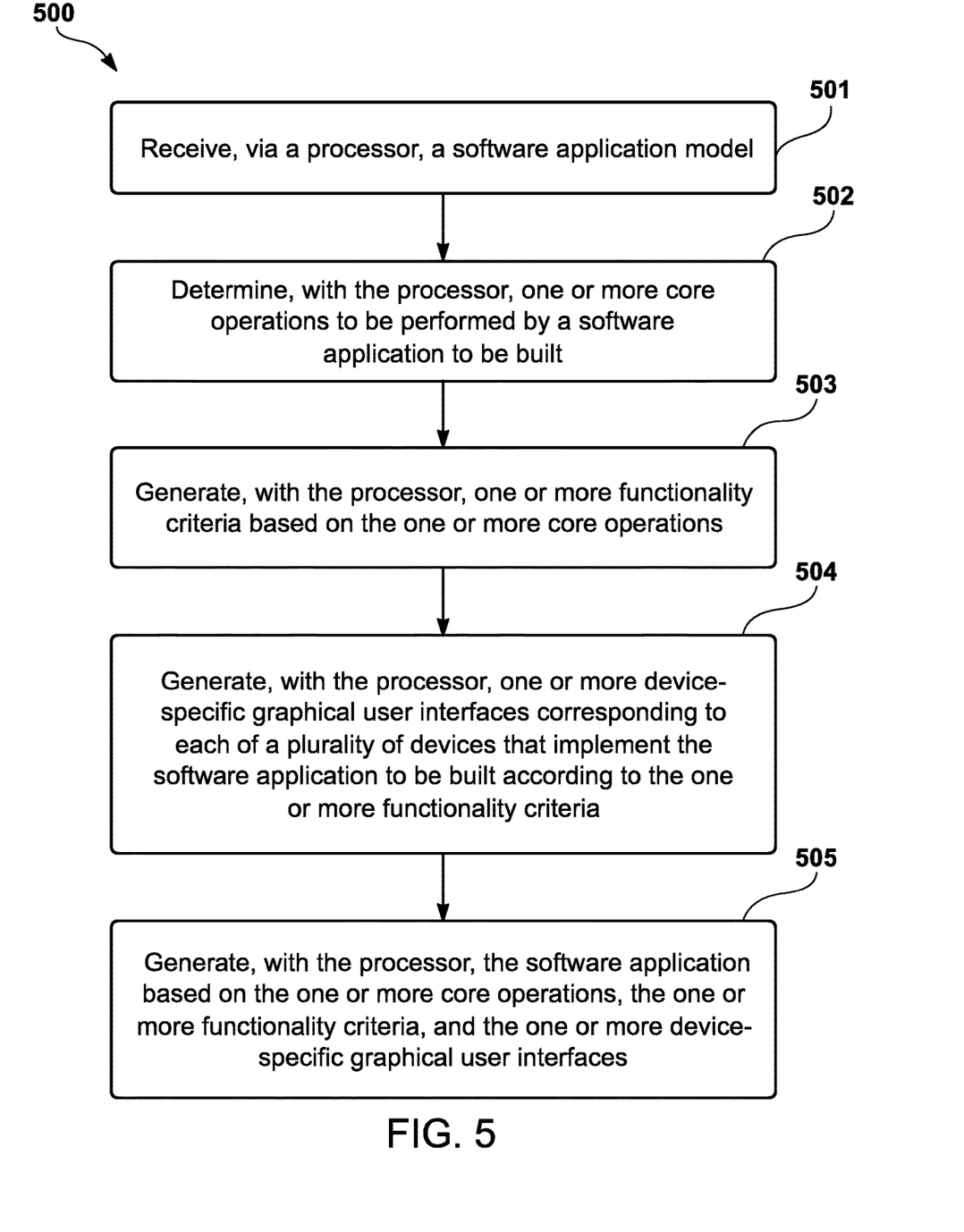
FIG. 5 illustrates a process that the pipeline engine utilizes to perform the composition of the software application based on the software application model.

Additionally, FIG. 5 illustrates a process 500 that the pipeline engine 101 uses to perform the composition of the software application 107 (FIG. 1) based on the software application model 102. At a process block 501, the process 500 receives, via the processor 401 (FIG. 4), the software application model 102. Further, at a process block 502, the process 500 determines, with the processor 401, one or more core operations to be performed by the software application 107 to be built. The one or more core operations are based on the software application model 102. Additionally, at a process block 503, the process 500 generates, with the processor 401, one or more functionality criteria based on the one or more core operations. Moreover, at a process block 504, the process 500 generates, with the processor 401, one or more device-specific GUIs corresponding to each of a plurality of devices that implement the software application 107 to be built according to the one or more functionality criteria. Finally, at a process block 505, the process 500 generates, with the processor 401, the software application 107 based on the one or more core operations, the one or more functionality criteria, and the one or more device-specific GUIs.

In one embodiment, the configurations provided for herein utilize a rules-based framework to generate the software application 107 from start-to-finish, which results in improvements to the functioning of a computer. For instance, rather than a computer having to expend significant computing resources to rewrite code for GUIs on different devices, the computer is able to reduce computing resources by efficiently determining device display configurations at the outset before the software application 107 is built. As another example, in another embodiment, the configurations provided for herein allow for improved search and analysis of the software application model 102 to deduce software application criteria that may only be implicitly stated within the software application model 102. In other words, the functioning of the computer is improved by analyzing and establishing criteria at the outset, which helps minimize computing errors at a later stage when coding corrections are more difficult and less efficient.

Although the processes described herein have been exemplified via a web portal, the process may be implemented via other types of software applications. For example, an application executed by a mobile computing device (e.g., smartphone, tablet device, smartwatch, smart wearable, etc.) may implement the aforementioned processes.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A computer program product comprising a non-transitory computer useable storage device having a computer readable program, wherein the computer readable program executed on a computer causes the computer to:
   receive, via a processor, a software application model;
   determine, with the processor, one or more core operations to be performed by a software application to be built, the one or more core operations being based on the software application model;
   generate, with the processor, one or more functionality criteria based on the one or more core operations;
   generate, with the processor, a plurality of device-specific graphical user interfaces corresponding to each of a plurality of devices that implement the software application to be built according to the one or more functionality criteria, the plurality of device-specific graphical user interfaces each having one or distinguishing features, in addition to one or more display dimensions, from the remainder of the plurality of device-specific graphical user interface, the one or more distinguishing features each corresponding to a different processing power of the each of the plurality of devices;
   automatically search through a database of previously selected graphical user interfaces to automatically determine the one or more device-specific graphical user interfaces based on a criteria of previously determined optimization performance; and
   generate, with the processor, the software application based on the one or more core operations, the one or more functionality criteria, and the one or more device-specific graphical user interfaces.

2. The computer program product of claim 1, wherein the software application model is an unfiltered data model without a software deployment framework.

3. The computer program product of claim 1, wherein the one or more core operations comprise an operational purpose.

4. The computer program product of claim 1, wherein the one or more core operations comprise one or more operational mechanics.

5. The computer program product of claim 1, wherein the one or more core operations comprise one or more operational rules.

6. The computer program product of claim 1, wherein the computer is further caused to generate an interactive session to obtain one or more user inputs that comprise data for the one or more core operations.

7. The computer program product of claim 1, wherein the computer is further caused to generate an interactive session to obtain one or more user inputs that comprise data for the one or more device-specific graphical user interfaces.

8. The computer program product of claim 1, wherein the computer is further caused to automatically search for data in the software application model that pertains to the one or more core operations.

9. The computer program product of claim 1, wherein the computer is further caused to automatically search for data in the software application model that pertains to the one or more device-specific graphical user interfaces.

10. A system comprising:
a data storage device that stores a software application model; and
a processor that receives the software application model, determines one or more core operations to be performed by a software application to be built, generates one or more functionality criteria based on the one or more core operations, generates a plurality of device-specific graphical user interfaces corresponding to each of a plurality of devices that implement the software application to be built according to the one or more functionality criteria, and generates the software application based on the one or more core operations, the one or more functionality criteria, and the one or more device-specific graphical user interfaces, the one or more core operations being based on the software application model, and automatically searches through a database of previously selected graphical user interfaces to automatically determine the one or more device-specific graphical user interfaces based on a criteria of previously determined optimization performance, the plurality of device-specific graphical user interfaces each having one or distinguishing features, in addition to one or more display dimensions, from the remainder of the plurality of device-specific graphical user interface, the one or more distinguishing features each corresponding to a different processing power of the each of the plurality of devices.

11. The system of claim 10, wherein the software application model is an unfiltered data model without a software deployment framework.

12. The system of claim 10, wherein the one or more core operations comprise an operational purpose.

13. The system of claim 10, wherein the one or more core operations comprise one or more operational mechanics.

14. The system of claim 10, wherein the one or more core operations comprise one or more operational rules.

15. The computer program product of claim 1, wherein the computer is further caused to generate an interactive session to obtain one or more user inputs that comprise data for the one or more core operations.

16. The system of claim 10, wherein the processor generates an interactive session to obtain one or more user inputs that comprise data for the one or more device-specific graphical user interfaces.

17. The system of claim 10, wherein the processor automatically searches for data in the software application model that pertains to the one or more core operations.

18. The system of claim 10, wherein the processor automatically searches for data in the software application model that pertains to the one or more device-specific graphical user interfaces.

* * * * *